Dec. 28, 1954     W. PECHY     2,698,122

CLOSING MACHINE FOR RANDOM HEIGHT CANS

Filed July 10, 1952     7 Sheets-Sheet 1

Fig. 1

INVENTOR.
WILLIAM PECHY

BY Charles H. Erne
Leland A. McCann
George W. Reiber
ATTORNEYS

Dec. 28, 1954 W. PECHY 2,698,122
CLOSING MACHINE FOR RANDOM HEIGHT CANS
Filed July 10, 1952 7 Sheets-Sheet 3

Fig. 3

INVENTOR.
WILLIAM PECHY
BY Charles H. Erne
Leland R. McCann
George W. Reiber
ATTORNEYS Dec. 28, 1954  W. PECHY  2,698,122
CLOSING MACHINE FOR RANDOM HEIGHT CANS
Filed July 10, 1952  7 Sheets-Sheet 4

INVENTOR.
WILLIAM PECHY
BY Charles H. Erns
Leland P. McCann
George W. Reiber
ATTORNEYS Dec. 28, 1954  W. PECHY  2,698,122
CLOSING MACHINE FOR RANDOM HEIGHT CANS
Filed July 10, 1952  7 Sheets-Sheet 5

INVENTOR.
WILLIAM PECHY
BY Charles H. Gene
Leland R. McCann
George W. Reiber
ATTORNEYS Dec. 28, 1954 W. PECHY 2,698,122
CLOSING MACHINE FOR RANDOM HEIGHT CANS
Filed July 10, 1952 7 Sheets-Sheet 6

INVENTOR.
WILLIAM PECHY
BY Charles H. Lune
Leland R. McCann
George W. Reiber
ATTORNEYS

INVENTOR.
WILLIAM PECHY

United States Patent Office 2,698,122
Patented Dec. 28, 1954

2,698,122

CLOSING MACHINE FOR RANDOM HEIGHT CANS

William Pechy, Belmar, N. J., assignor to American Can Company, New York, N. Y., a corporation of New Jersey Application July 10, 1952, Serial No. 298,064

13 Claims. (Cl. 226—82.4)

The present invention relates to container or can closing machines and has particular reference to devices for properly locating and closing cans having random height dimensions. This is an improvement upon the machine disclosed in United States Patent 2,393,988 issued February 5, 1946, to W. D. Jordan et al. on Closing Machine.

The instant machine, like the machine disclosed in the above mentioned Jordan et al, patent, is used primarily for closing irregular or non-circular shaped cans having various heights within a reasonable range, such as cans used for packing hams and the like in which the cans vary in height in increments of substantially one-eighth of an inch so that the cans may be selected to fit the size of the ham to be packed.

An object of the invention is the provision of a can closing machine wherein the devices for supporting the cans during the closing operation are automatically adjusted to suit the height of the can so that cans having random heights may be closed in the same machine.

Another object is the provision in such a machine of devices for enclosing and sealing off a can to be closed so that cans which are to be vacuumized prior to closing may be effectively segregated from the outside atmosphere.

Another object is the provision in such a machine of a novel Geneva motion device wherein the cans to be closed may be intermittently advanced through the various stations in the machine with a smooth regular movement which prevents spilling of liquid contents of the cans and which is conducive to smooth machine operation and long life to heavy machine parts.

Numerous other objects and advantages of the invention will be apparent as it is better understood from the following description, which, taken in connection with the accompanying drawings, discloses a preferred embodiment thereof.

Referring to the drawings.

As a preferred or exemplary embodiment of the instant invention, the drawings illustrate a vacuum closing machine for vacuumizing irregular or noncircular shaped random height sheet metal cans A (Fig. 17) having hams packed therein and for permanently securing sheet metal covers or end closures B (Fig. 18) thereto in a suitable seam C (Fig. 20) preferably formed by the interfolding of a flange D (Fig. 17) on the bodies of the cans with a cooperating flange part on the covers B.

Figure 1:
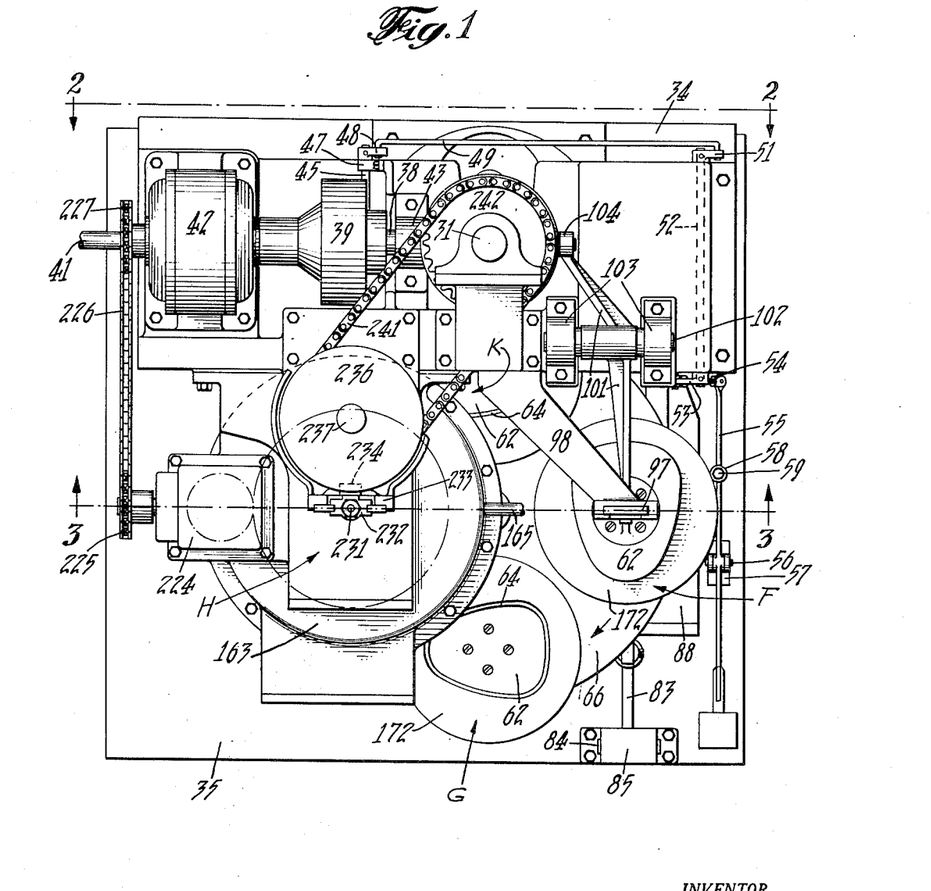
Figure 1 is top plan view of a can closing machine embodying the instant invention.

In such a machine the random height cans A to be closed, are placed individually and manually on vertically movable supports at a loading station F (Fig. 1) which is one of a plurality of stations in the machine. At this station the can is pushed down until its top flange D reaches a predetermined level. This level is constant for all heights of cans. While maintaining this level, the can is advanced into a cover receiving station G where a cover B is placed manually in loosely superimposed position on the can.

The can A and its superimposed cover B are then advanced into a seaming or closing station H where the can is vacuumized and the vacuumized can and its cover are lifted into a rotatable seaming or closing head J (Fig. 3) for the operation of permanently securing the cover to the can. The seaming head J is disposed at a fixed level and it is for this reason that all cans before being presented to the head must be prelocated at the loading station in accordance with the height of the can to be closed. Following the closing operation the sealed can is advanced to and through an idle station K (Fig. 1) and then returned to the loading station F where the sealed can is removed manually from its support and an unsealed can substituted for a repeat cycle of operation of the machine as just described.

The machine is designed on the stationary can principle in which the can does not revolve during the seaming operation. Operation of the machine is effected intermittently, i. e. started and stopped for each can at the will of the operator and in accordance with the time required to unload and load the cans at the loading station F. This operation of the machine is effected through a vertical drive shaft 31 (Figs. 1 and 2) journaled at its upper and lower ends in bearing blocks 32, 33. The upper bearing block 32 is secured to the upper portion of a frame 34 which constitutes the main frame of the machine, while the lower bearing block 33 is carried on a base plate 35 which supports the frame 34.

Figure 2:
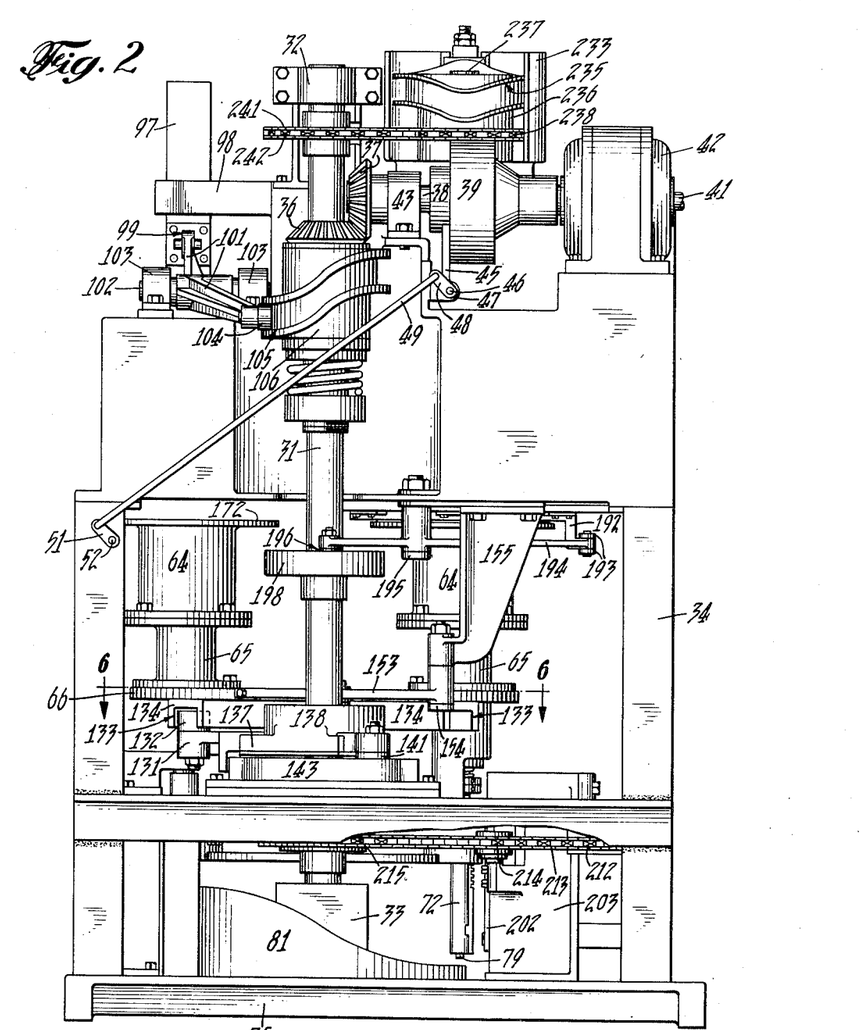
Fig. 2 is a side elevation of the machine as taken substantially along a plane indicated by the lines 2—2 in Fig. 1.

The drive shaft 31 is rotated by a bevel gear 36 secured to the shaft and meshing with a driving bevel gear 37 secured to a clutch shaft 38 connected through a one revolution clutch 39 to a motor shaft 41 of an electric motor 42 supported on the machine frame 34. The clutch shaft 38 is journaled in a bearing 43 secured to the machine frame. The clutch 39 is of the type illustrated in Figs. 1 and 5 of the above mentioned Jordan Patent 2,393,988 and is actuated to connect the clutch shaft 38 to the motor shaft 41 through a trip arm 45 (Fig. 2).

The trip arm 45 is mounted on a pivot pin 46 (Fig. 2) carried in a bearing 47 secured to the frame 34 adjacent the clutch 39. The pivot pin 46 also carries an actuating arm 48 which is connected by a rod 49 to a similar actuating arm 51 mounted on one end of a shaft 52 (see also Fig. 1) journaled in the machine frame 34. The opposite end of the shaft 52 carries an arm 53 (see Figs. 1 and 3) which is connected by a rod 54 to a foot treadle 55. Intermediate its ends the foot treadle 55 is mounted on a pivot pin 56 in a bracket 57 on the base plate 35. Between the pivot pin 56 and the rod 54 the foot treadle 55 is formed with a boss 58 which loosely surrounds an upright bolt 59 which extends up from the base plate 35. A compression spring 60 interposed between the foot treadle 55 and a large head on the upper end of the bolt holds the free end of the foot treadle in an elevated position, with the clutch trip arm 45 in position to keep the clutch disengaged.

Hence when it is desired to start the machine, after loading a can to be closed in the machine, it is merely necessary to depress the free end of the foot treadle 55 and this, through the trip arm 45, engages the clutch 39 and thereby connects the clutch shaft 38 with the motor shaft 41. The motor 42 preferably is continuously operated, and therefore immediately rotates the clutch shaft 38 through one revolution when the clutch 39 is engaged. This in turn rotates the vertical drive shaft 31 through one revolution and thus actuates the devices at the various working stations, through their cycle of operation so that the cans at all of the various stations are fully operated upon simultaneously. After one complete revolution of the drive shaft 31, the clutch 39 automatically disengages, in the manner disclosed in the above mentioned Jordan patent, and the machine stops.

Figure 17:
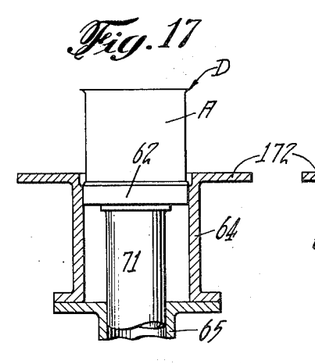
Figs. 17, 18, 19, 20 are sectional schematic views illustrating the steps of receiving a can for closing, applying a cover to the can, closing the can, and positioning it for removal after closing.

An open can A, loaded into the machine at the loading station F for closing, is placed on a support or lifter pad 62 (Figs. 1 and 3) as shown in Fig. 17. There are four of these lifter pads 62, one for each station in the machine and they are carried along a circular path of travel to and through the various stations for the operations to be performed on the cans. For this purpose each lifter pad 62 is disposed in and is completely surrounded by an open-top mold 64 which is secured to the upper end of a vertical bearing bracket 65. There are four of these molds 64 and four bearing brackets 65, the latter being secured to a horizontally disposed rotatable turn table 66 adjacent its outer periphery. The turn table 66 is mounted on the upper end of a vertical shaft 67 journaled in a bearing bracket 68 supported on the base plate 35.

The molds 64 and the lifter pads 62 disposed within them are of an irregular shape to fit the outer contour of the cans A and to thus hold the cans against rotation in the molds. The lifter pads 62 within the molds 64 are carried on the upper ends of lifter sleeves 71 which are slideably disposed within the vertical bearing brackets 65. These sleeves are keyed to depending lifter stems 72 which are slideably carried in bearings 73 in the lower ends of the bearing brackets 65 and which extend up into the sleeves 71.

In order to provide for resilient action of the lifter pads 62 during the can closing operation, a compression spring 74 surrounds each of the lifter stems 72 and is interposed and compressible between a shoulder 75 in the lifter sleeves and a locknut 76 threadably secured to each of the stems 72. Below the locknut 76, each lifter stem carries a vertically disposed spline 77 having rack teeth 78 for use in locking the lifter stem in a predetermined position and for subsequently lifting the stem and the lifter pad 62 actuated thereby. The lower ends of the stems 72 carry cam rollers 79 which, after the can closing operation, ride upon a curved stationary edge cam 81 located below a portion of the path of travel of the stems 72 and secured to the base plate 35.

Figure 3:
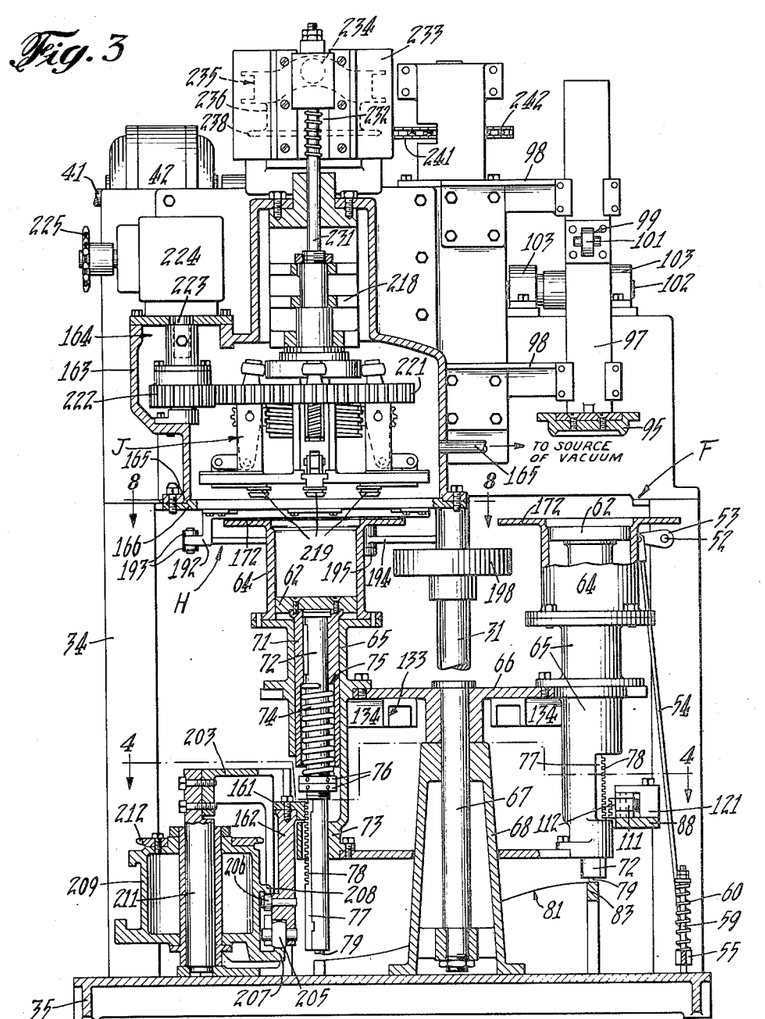
Fig. 3 is a vertical section taken substantially along the line 3—3 in Fig. 1.

At the beginning of a cycle of travel of a can A through the machine, a lifter pad 62 and its actuating stem 72 is at the loading station F and in the elevated position shown in Figs. 3 and 17 with the lifter pad disposed near the top of its mold 64 for the reception of a can. In this position of the stem 72 its roller 79 rests on the free end of a yieldable, depressible arm 83 (see Fig. 5) which forms a resilient extension of the edge cam 81. The outer end of the arm 83 is mounted on a pivot pin 84 carried in a bearing block 85 secured to the base plate 35.

Intermediate its length, the arm 83 is attached to a plunger rod 86 of an air cushion plunger disposed within a closed air cushion cylinder 87 pivotally secured at its upper end to a bracket 88 attached to the base plate 35. An inlet tube 89 attached to the cylinder 87 near its bottom end leads from any suitable source of air under pressure and admits this air into the cylinder below the plunger on the stem 86 to hold the plunger stem and the arm 83 up under a cushion of the air. This is a conventional, commercially made air cushion device. A stop projection 91 formed by a notch in the free end of the arm 83 is held by the air cushion device in engagement with an oppositely disposed lug 92 on the edge cam 81 and thus limits the upward travel of the free end of the arm.

When an open can A is placed manually in position on the elevated lifter pad 62, the operator steps on the foot treadle 55, and starts the machine as above described. Immediately a pusher or topper pad 95 (Fig. 3) located at the loading station F, above and in vertical alignment with the lifter pad 62, moves down against the flange D of the can A on the lifter pad 62 and pushes the can, the lifter pad, the lifter stem 72, and the arm 83 down against the cushion of air in the cylinder 87 until the top edge or flange D of the can is located at a predetermined level horizontal plane below the top of the mold 64 and relative to the closing head J, the can being disposed entirely within the mold. This movement of the topper pad 95 is effected by cam action, the pad moving down the same distance for all cans, but engaging against the cans in point of time sooner or later in accordance with the height of the cans. This movement does not compress the spring 74 in the lifter pad assembly because of a greater strength in the spring over the resistance of the air cushion.

The topper pad 95 is secured to the lower end of a vertical slide 97 (Figs. 1, 2 and 3) which operates in a pair of spaced upper and lower slide bearing brackets 98 attached to the main frame 34 of the machine. Intermediate the brackets 98 the slide 97 is formed with an actuating slot 99 which serves as a bearing for one end of a slide actuating lever 101 mounted between its ends on a pivot shaft 102 carried in bearing blocks 103 secured to the machine frame 34. The opposite end of the lever 101 carries a cam roller 104 (Fig. 2) which operates in a cam groove 105 of a barrel cam 106 mounted on the vertical drive shaft 31.

Hence as soon as the machine starts, the drive shaft 31 rotates the cam 106 and rocks the lever 101 to push the topper pad 95 down through its fixed can locating stroke and thence to raise the pad through a return stroke to its original or normal elevated position. The locating of the top edge or flange D of the can at its predetermined level is effected through only a partial rotation of the drive shaft 31. During the remaining portion of a complete revolution of the drive shaft the can is locked at its located level and then advanced into the next station for the reception of a cover.

Figure 4:
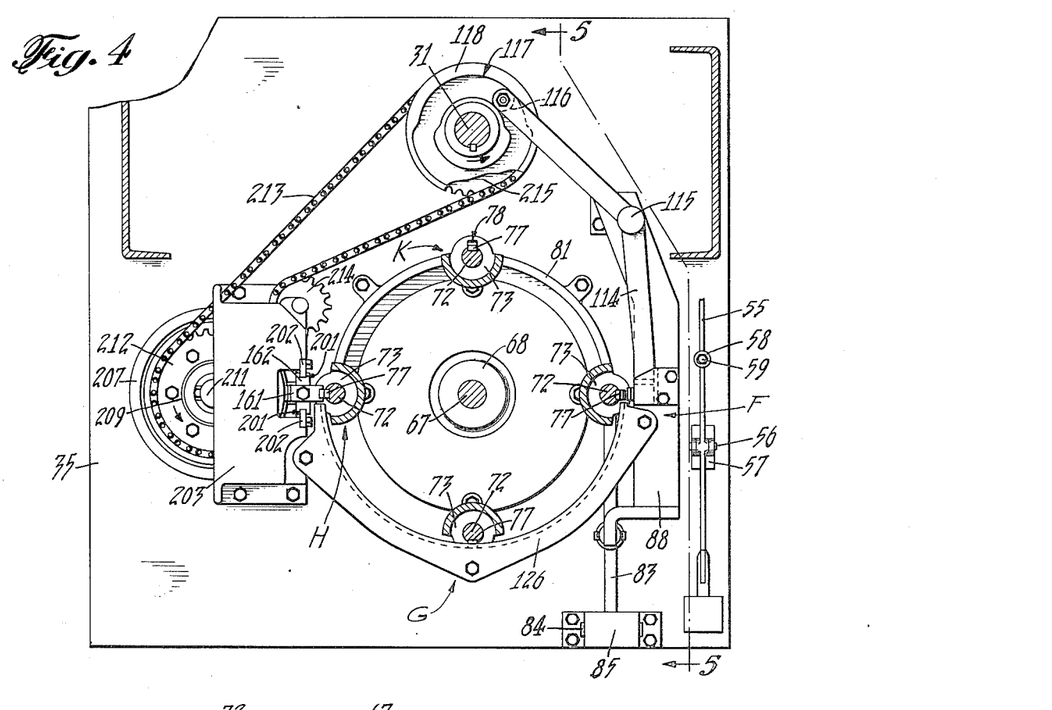
Fig. 4 is a top plan sectional view taken substantially along the broken line 4—4 in Fig. 3.

Locking of the can at its located level is effected by a rectangular shaped locking block 111 (Figs. 13, 14, 15, 16) which is disposed at the loading station F and is adjacent the lifter stem 72. The inner face of the block 111 adjacent the lifter stem 72 is formed with a series of rack teeth 112 which match the rack teeth 78 in the spline 77 in the lifter stem. The locking block 111 is slideably disposed in a yoke 113 formed on one end of a horizontal lever 114 (Figs. 4 and 5) mounted intermediate its ends on a shouldered pivot stud 115 clamped in the bracket 88. The opposite end of the lever carries a cam roller 116 which operates in a cam groove 117 of a face cam 118 secured to and rotating with the vertical drive shaft 31.

The yoke 113 of the lever 114 preferably is rectangular in shape with flat top and bottom faces and is slideably disposed between the top of the bracket 88 and an L-shaped retainer block 121 secured to the top of the bracket 88. Thus the locking block 111 in the yoke 113 and the yoke itself are confined against vertical displacement but are free to move laterally toward and away from the lifter stem 72. The locking block 111 also is movable laterally within the yoke 113 but is confined against displacement therefrom by a pin 122 (Fig. 14) which is secured in the yoke 113 and extends through the yoke and through an elongated slot 123 formed in the locking block in line with the rack teeth 112 in the block. A compression spring 124 interposed between the outer face of the locking block 111 and the inner face of the retainer block 121 provides for yieldability of the locking block and normally holds the block 111 against the pin 122 in the yoke 113 as shown in Fig. 14.

Figure 14:
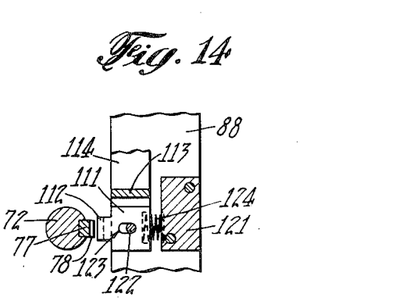
Figs. 14, 15 and 16 are sectional views taken substantially along a horizontal plane indicated by the lines 14—14 in Fig. 13, the views illustrating certain of the parts in different positions incidental to performing a locking operation.
Figure 16:
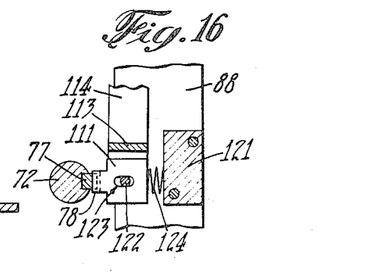

The normal position of the lever 114 relative to the lifter stem 72 is shown in Fig. 14. In this position of the lever, the rack teeth 112 of the locking block 111 are slightly spaced away from the rack teeth 78 of the lifter stem 72 to permit free vertical movement of the stem during the can locating operation. While the topper pad 95 momentarily holds the can A in its depressed and properly located position, the cam 118 rocks the yoke 113 of the lever 114 inwardly toward the lifter stem 72 and thereby effects a meshing of the rack teeth 112 of the locking block 111 with the rack teeth 78 of the lifter stem as shown in Fig. 16. The lifter stem 72 is thus locked against vertical travel and hence remains in its locked position when the topper pad 95 moves upwardly away from the located can during the return movement of the topper pad.

Figure 15:
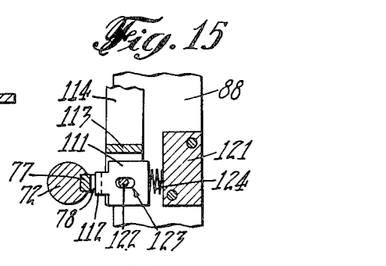

In case the rack teeth 78, 112 do not exactly mesh when the locking block 111 is moved into stem locking position as explained above, the pin and slot connection between the locking block 111 and the yoke 113 permits the block to stop upon abutting engagement of its rack teeth 112 with the stem rack teeth 78 while the lever 114 rocks through its full stroke. During this movement of the yoke relative to the block, the pin 122 moves along the slot 123 as shown in Fig. 15 while the spring 124 holds the block against the lifter stem rack teeth. When the topper pad 95 starts to move up through its return stroke it permits the unlocked lifter stem 72 to rise until the rack teeth 78 on the stem align with the rack teeth 112 on the locking block 111. This rise of the stem is only slight, being limited to less than the thickness of one tooth and therefore is insufficient to appreciably disturb the proper location of the can. The alignment of the teeth 78, 112 permits the spring 124 to push the locking block 111 toward the stem 72 and thereby effects a full meshing of the teeth and a locking of the stem in a predetermined position.

Figure 18:
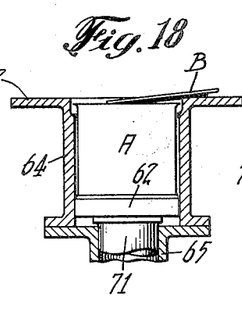

As soon as the lifter stem 72 is locked in position, and before the topper pad 95 is fully returned to its normal elevation, the turn table 66 is rotated through a partial rotation to advance the prelocated can A from the loading station F to the cover receiving station G where a cover B is inserted manually into the top of the mold 64 and placed in a loosely superimposed position on the flange D of the can in the mold as shown in Fig. 18. Nothing further is done at this station.

During this rotation of the turn table 66 the lifter stem 72 is maintained in its prelocated position to hold the can in its prelocated position by a curved guide rail 126 (Figs. 4, 5 and 13) which extends adjacent the path of travel of the lifter stems 72 from the loading station F to the closing station H. The inner curved face of the rail 126 is formed with a plurality of horizontal grooves and intervening projections constituting rack teeth 127 which correspond with and align with the rack teeth 112 in the locking block 111 for the reception of the rack teeth 78 in the splines 77 of the stems 72.

Hence when the turn table 66 starts to rotate, the lifter stem 72 at the loading station F moves laterally with the table and thus the rack teeth 78 in the stem spline 77 slide horizontally along the rack teeth 112 in the locking block 111 and enter the rack teeth 127 in the guide rail 126. The rack teeth 78 are well advanced in the guide rail 126 before they leave the locking block 111 and thus the prelocated position of the lifter stem 72 and the can A supported on the lifter pad 62 attached thereto is fully maintained.

Figure 6:
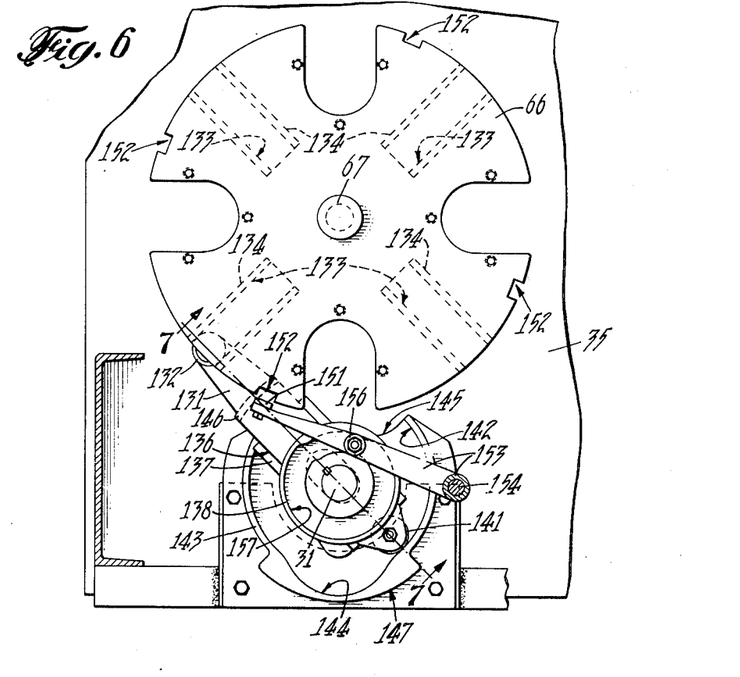
Fig. 6 is a top plan sectional view taken substantially along the line 6—6 in Fig. 2 with parts broken away.

Rotation of the turn table 66 through its partial rotations preferably is effected by a Geneva device having an arm 131 actuated by the vertical drive shaft 31 and carrying at one end a roller 132 which is engageable in radial open end grooves 133 formed in radially disposed blocks 134 on the under side of the turn table. There are four of these blocks 134 arranged as shown in Fig. 6, one for each station in the machine so that a mold 64 and its can A may be advanced from one station to the other.

In order to provide for smooth starting, stopping and a more uniform rotation of the turn table 66 over the usual simple harmonic motion of ordinary Geneva devices, the arm 131 is not directly keyed to the shaft 31 but is slideably mounted in a diametrically disposed slideway 136 formed in a rotatable member 137 integral with a face cam 138 which is keyed to and rotates with the vertical drive shaft 31. The arm 131 surrounds the drive shaft 31 and for this purpose is provided with a clearance slot 139 for the shaft. The end of the arm 131 opposite the roller 132 is provided with a cam roller 141 which operates in a cam groove 142 in a stationary cam 143 which surrounds the drive shaft 31 and is secured to a portion of the machine frame 34.

The face cam groove 142 for its major portion is concentric with the axis of the vertical drive shaft 31. A minor portion of the groove 142 is offset and of a sharper curved contour as at 144 (Fig. 6). This offset portion of the groove is included in the complementary arc described by the roller 132 as it passes through an arc beginning at its entrance into or engagement with a radial groove 133 and terminating as it leaves or disengages from the radial groove 133.

As the cam roller 141 traverses this offset portion 144 of the cam groove 142 it slides the arm 131 in a direction away from the turn table 66 and thereby causes the roll 132 to travel through its angular movement along a flatter arc. In thus traveling along this flatter arc, its speed of travel is more uniform and this speed is transmitted to the turn table 66 through engagement of the roller 132 with grooved members 134 under the table with the result that the starting and stopping of the table is effected with a smooth slow action, without sudden jolts, while the rotation of the table is steady and uniform.

Figure 7:
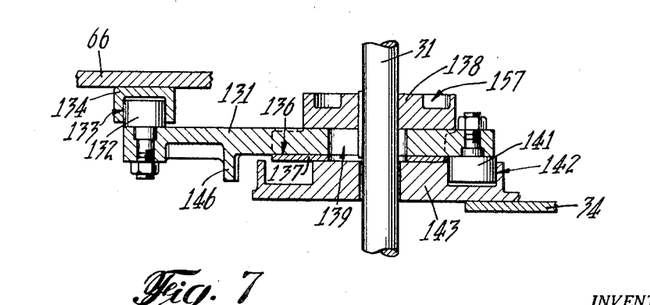
Fig. 7 is an enlarged sectional view taken substantially along the line 7—7 in Fig. 6, with parts broken away.

In order to facilitate assembling of the parts of this improved Geneva device, the portion of the face cam groove 142 adjacent the turn table 66 is cut away as at 145 to gain access to the groove. When the cam roller 141 traverses this open portion of the groove 142, it is maintained in alignment with the groove by a guide lug 146 (Figs. 6 and 7) which depends from the arm 131 and which rides against a curved guide wall 147 formed on the periphery of the cam 143 concentric with the axis of the drive shaft 31 and is located diametrically opposite the cut-away 145 in the cam.

When the turn table 66 has completed a partial rotation, it is temporarily locked against further movement until the next cycle of rotation of the drive shaft 31. Locking and release of the table is effected by a locking lug 151 (Fig. 6) which is engageable into locking notches 152 formed in the periphery of the table. There is one of these notches for each station in the machine. The locking lug 151 is formed on one end of a lever 153 which extends adjacent the drive shaft 31 and which is mounted on a pivot pin 154 secured in a bracket 155 (see Fig. 2) attached to the machine frame 34.

Intermediate its length, the lever 153 carries a cam roller 156 which operates in a groove 157 of the cam 138 mounted on and rotating with the drive shaft 31. The groove is shaped to rock the lever 153 at the proper time and thus inserts the locking lug 151 into a notch 152 in the table 66 when the notch is moved into position adjacent the lug and thereby holds the table stationary. In a similar manner the cam groove 157 withdraws the lug 151 from a notch 152 when it is again time to rotate the table through another partial rotation.

When the turn table 66 advances a prelocated can A and its loosely superimposed cover B in a mold 64 from the cover receiving station G to the seaming station H, the rack teeth 78 of the spline 77 in the lifter stem 72 sliding along the curved guide rail 126 to maintain the can A at its prelocated level, ride out of the grooves at the terminal end of the guide rail at the seaming station H and ride into a similarly grooved lifter block 161 (Figs. 3 and 4) secured to the top of a vertically reciprocable lifter slide 162 disposed adjacent the path of travel of the lifter stems 72 with the lifter block 161 normally in horizontal alignment with the grooved guide rail 126. This transfer of the lifter stem 72 from the guide rail 126 to the lifter block 161 is effected without changing the level of the can A in its mold 64. The turn table 66 stops its partial rotation when the rack teeth 78 of the lifter stem 72 are locked fully in mesh with the lifter block 161 thus locking the mold 64 at the seaming station H in vertical alignment with the seaming head J disposed at this station.

Figure 19:
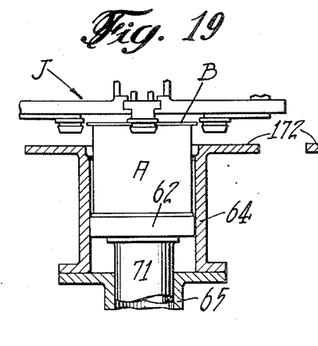

At the seaming station H, the can A and its loosely superimposed cover B are vacuumized and then elevated a predetermined distance to raise the vacuumized can and its cover partially out of its mold 64 and into the seaming head J as shown in Fig. 19 for the can closing or seaming operation.

For the vacuumizing operation, the top of the mold 64 is sealed against a stationary housing 163 (Figs. 1 and 3) which encloses an open bottom chamber 164 that may be vacuumized in any suitable manner as by a pipe 165 leading to a suitable source of vacuum. The housing 163 is formed as a portion of the machine frame 34. The lower open end of the housing 163 is formed with a horizontal flange 165 which carries a wide annular member 166 securely bolted in place and which constitutes a bottom for the housing. This bottom is formed with a central concentric opening 167 (see Fig. 8) having a diameter which is slightly greater than the major axis of the mold 64 for the passage of a can therethrough as will be hereinafter explained. When a mold 64 is located at the seaming station H its center is concentric with the annular member 166.

Sealing of the mold 64 against the bottom of the housing 163 is effected by a resilient annular sealing ring 171 (Figs. 8, 9, 10 and 11) which is concentric with the annular member 166 and which is interposed between the bottom of the member and a wide horizontal flange 172 formed on the molds 64 at their top ends. The sealing ring 171 preferably is made of rubber or the like material and in cross-sectional shape is formed with a rectangular body portion 170 having an inwardly projecting annular web 173 (see Fig. 9) thus resembling a laterally disposed T. This ring is located adjacent and surrounds the opening 167 in the annular member 166 and is securely held in place by a clamp ring 175 which clamps the web 173 of the sealing ring tightly against the bottom face of the annular member, thus leaving the body portion 170 free to move vertically. Screws 176 extend through the clamp ring 175 and the web 173 and are threadedly secured in the annular member for this purpose.

Figure 9:
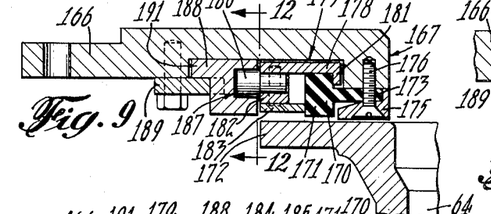
Figs. 9 and 10 are enlarged sectional details as viewed substantially along the line 9—9 in Fig. 8, with parts broken away, the two views showing different positions of certain of the parts during operation of the machine.
Figure 10:
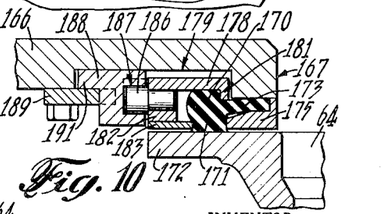
Figure 11:
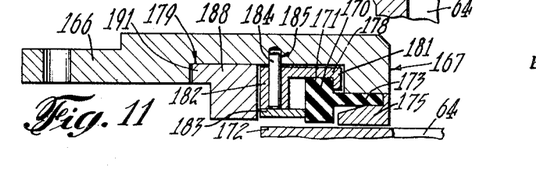
Fig. 11 is a view similar to Fig. 9, the view being taken substantially along the line 11—11 in Fig. 8.
Figure 13:
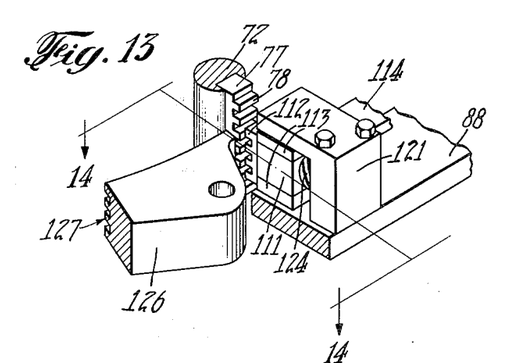
Fig. 13 is an enlarged perspective view of a locking device associated with the can support, with parts broken away.

The body portion 170 of the sealing ring 171, normally is maintained at a level slightly spaced above the flange 172 of the molds 64 as best shown in Fig. 9 to permit lateral movement of the molds into and out of the seaming station H. However when a mold 64 is located at the seaming station H the body portion 170 of the sealing ring is compressed against the flange 172 of the mold as best shown in Fig. 10 to hermetically seal the space between the annular member 166 and the flange 172 of the mold and thereby exclude the outside air from the interior of the mold and the housing chamber 164.

Compression of the body portion of the sealing ring 171 is effected preferably by a compression ring 178 (Figs. 8 and 9) which is located above the sealing ring 171 and is disposed in an annular recess 179 formed in the bottom face of the annular member 166. The inner edge portion of the compression ring 178 is formed with a depending shoulder 181 which engages over and extends down adjacent the inner top edge of the body portion of the sealing ring as shown in Fig. 9 to confine this portion of the sealing ring.

The outer edge portion of the compression ring 178 is formed with a depending skirt 182 which at its lower end carries an annular horizontally disposed confining washer 183. The inner edge of this washer 183 engages against and surrounds the outer peripheral face of the body portion of the sealing ring 171 near its lower edge as best shown in Fig. 9 and thereby confines and backs up this portion of the sealing ring.

The depending skirt 182 of the compression ring 178 carries a plurality of vertically disposed pilot pins 184 (Fig. 11) which extend up into blind bores 185 in the annular member 166 and thus restrain rotative movement of the compression ring while permitting the ring to be raised and lowered in its recess 179. This depending skirt 182 also carries a plurality of actuating pins 186 (Figs. 9, 10, and 12) which are spaced around and extend laterally from the outer face of the skirt. These actuating pins 186 project into and operate in bayonet or inclined cam grooves 187 formed in the inner vertical face of an oscillatable actuating ring 188 disposed in the recess 179 of the annular member 166. The actuating ring 188 surrounds the compression ring 178 and is loosely held in place by a plurality of retainer plates 189 bolted on the outer periphery of the actuating ring. The retainer intervals therearound and engaging under a flange 191 on the outer periphery of the actuating ring. The retainer plates 189 thus support the actuating ring 188 vertically and maintain it laterally in concentricity with the compression ring 178.

At one place around its periphery the actuating ring 188 is formed with a depending and outwardly extending lug 192 (Figs. 3 and 8) to which is pivotally attached one end of an actuating rod 193. The opposite end of the rod is pivotally secured to one end of an actuating lever 194 mounted intermediate its ends on a pivot pin 195 secured in the machine frame 34. The opposite end of the lever 194 carries a cam roller 196 which operates in a cam groove 197 of a face cam 198 carried on and rotating with the vertical drive shaft 31 (see also Fig. 2).

Figures 8, 12:
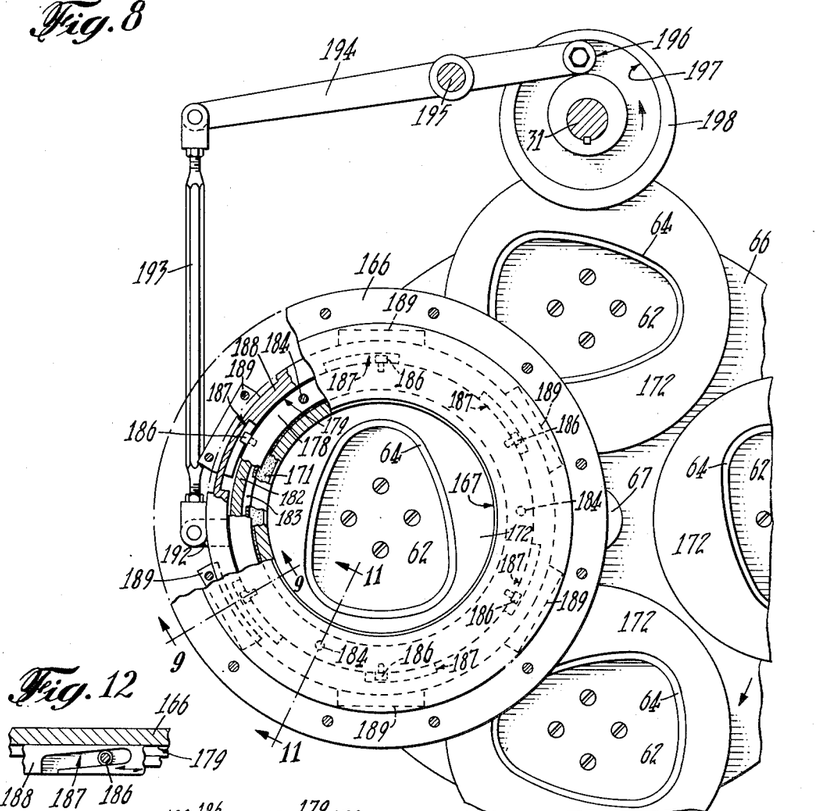
Fig. 8 is an enlarged top plan sectional view taken substantially along the line 8—8 in Fig. 3, with parts broken away.
Fig. 12 is a sectional detail as viewed along the line 12—12 in Fig. 9, with parts broken away.

Hence as the drive shaft 31 rotates through a one revolution cycle of operation as explained hereinbefore, it rotates the face cam 198 through one revolution, which at the beginning of its cycle of operation rocks the actuating lever 194 in a clockwise direction as viewed in Fig. 8 and at the end of its cycle of operation rocks the lever in a counterclockwise direction. When rocked in the clockwise direction, the actuating lever 194, through the rod 193 and lug 192, partially rotates the actuating ring 188 in a clockwise direction as viewed in Fig. 8 and toward the right as viewed in Fig. 12, and this, through the bayonet cams 187 pushes down on the compression ring 178 and thus compresses the body portion 170 of the sealing ring 171 against the flange 172 of the mold 64 as shown in Fig. 10.

It should be noted in this compressed condition, the sealing ring portion 170 is confined at its top and bottom edges by the shoulder 181, the confining ring 183 and the clamping ring 175 and thus is prevented from flaring out loosely. The compressed sealing ring, thus confined provides a hermetic seal between the chamber housing 163 and the mold flange 172 and thus permits of rapid vacuumization of the interior of the chamber 164 and the mold 64 through the vacuum pipe 165 to vacuumize the can A and the cover B retained in the mold.

At the conclusion of the seaming operation which takes place between the beginning and the end of the cycle of operation of the face cam 198 and while the mold 64 and the chamber 164 are hermetically sealed and in a vacuumized condition, the chamber is vented in any suitable manner and the actuating ring 188 is rotated back into its original position by the counter-clockwise rocking movement of the actuating lever 194 and this, through the bayonet cams 187, raises the compression ring 178 to the position shown in Fig. 9 and thus releases the body portion 170 of the sealing ring 171 for further advancement of the mold as will be hereinafter explained.

While the mold 64 and chamber 164 are hermetically sealed and in a vacuumized condition the can A and cover B are lifted up into the seaming head J for the seaming operation. This is effected by a raising of the lifter stem 72 which is interlocked with the groove lifter block 161 carried on the upper end of the reciprocable lifter slide 162 located at the seaming station H. The raising of the lifter stem is brought about by a corresponding vertical movement of the lifter slide. For this purpose the lifter slide 162 is formed with a pair of vertical slide grooves 201 (Fig. 4) which operate on a pair of vertical gibs 202 secured to a bracket 203 mounted on the base plate 35 at the seaming station H.

Reciprocation of the lifter slide 162 is effected by a pair of cam rollers 205, 206 (Fig. 3) which operate against respective cam tracks 207, 208 formed on a barrel cam 209 rotatably mounted on a stationary vertical shaft 211, the ends of which are fixed in the bracket 203. The cam 209 is rotated in time with the other moving parts of the machine by a sprocket 212 which is secured to the upper end of the barrel cam. The sprocket 212 is rotated by an endless chain 213 (Fig. 4) which operates over an idler sprocket 214 mounted on the bracket 203 and over a driving sprocket 215 mounted on and rotatable with the vertical drive shaft 31 (see Fig. 2).

Hence during the rotation of the vertical drive shaft 31 through a cycle of operation, the barrel cam 209 rotates through one complete revolution and thus raises the lifter slide 162 through an up stroke, then holds the slide in its up position during the seaming operation, and returns the slide to its normal low position at the end of the seaming operation. This movement of the lifter slide 162, through the interlocked rack teeth of the lifter block 161 and the spline 77 on the lifter stem 72, raises the lifter stem 72 and its attached lifter pad 62 a predetermined distance which is just sufficient to raise the vacuumized can A and its loosely superimposed cover B out of the mold 64 and into proper position in the seaming head J, as best shown in Fig. 19, for the seaming operation.

The seaming head J may be of any type which operates upon the raised can A and its cover B while the can and cover remain stationary. The drawings illustrate a rotating head of the character disclosed in United States Patent 1,716,618 issued June 11, 1929, to Harvey L. Bryant on Can Closing Machine. The head is located in the housing chamber 164 (Fig. 3) and is suspended from a bearing bracket 218 secured to the upper portion of the housing 163.

At its lower end, the seaming head J carries a plurality of first and second operation seaming rolls 219 which are mounted on slides in the head and which are movable inwardly as the head is rotated to engage against and interfold the flange of the cover B with the flange D of the can A lifted into the head, to produce the seam C which permanently secures the cover to the vacuumized can A. This is a conventional can and cover seaming operation of the character fully explained in the above mentioned Bryant Patent 1,716,618. The level at which the seaming rolls 219 operate (see Fig. 19) is the level to which the flange D of the can A is raised, by operation of the barrel cam 209, from the level at which the flange D was prelocated at the loading station F and it is for this purpose that all cans, whatever their height, are prelocated at the loading station F with their top flanges D at a predetermined level below the level of the seaming rolls 219.

Rotation of the seaming head J is effected in time with the rotation of the clutch 39 so that the seaming rolls 219 will be in proper position to receive a can when the can is lifted into the head. For this purpose the head carries a gear 221 (Fig. 3) which meshes with and is driven by a pinion 222 carried on a shaft 223 which depends from and forms a part of a conventional speed reduction unit 224 supported on the machine frame 34. The reduction unit 224 is driven by a sprocket 225 which is a part of the unit and which is rotated by an endless chain 226 (Fig. 1) which operates over a driving sprocket 227 carried on and rotating with the shaft 41 of the electric motor 42.

Upon completion of the seaming operation, the fully closed and sealed can A is pushed out of the seaming head J as the lifter pad 62 descends as explained above in connection with the lifter slide 162, to return the can to its original level within its mold 64 so that the turn table 66 may be partially rotated to advance the can to the idle station K without interference. This discharge of the closed can from the seaming head J is effected by a knockout pad disposed within the head and which is a usual element in such heads. The knockout pad is secured to the lower end of a knockout rod 231 (Figs. 1 and 3) which extends up through the head and through the bearing bracket 218. The upper end of the rod is yieldably mounted in a vertical slide 232 which operates in a vertical slideway formed in a bracket 233 supported on the machine frame 34.

The slide 232 carries a cam roller 234 which operates in a cam groove 235 of a barrel cam 236 mounted on a short vertical shaft 237 carried in the bracket 233 (see also Fig. 2). The cam is rotated in time with the other parts of the machine by a sprocket 238 which is part of the cam. The sprocket in turn is rotated by an endless chain 241 which operates over and is driven by a sprocket 242 mounted on and rotating with the vertical drive shaft 31. The cam 236 is rotated through one revolution for each cycle of operation of the machine parts and thus at the proper time depresses the knockout rod 231 to eject the closed can A from the seaming head J at the proper time.

As the turn table 66 starts to move through its following partial rotation to advance the closed can A to the idle station K, the rack 78 of the spline 77 in the lifter stem 72 moves laterally with the stem out of and free of the grooved lifter block 161 of the lifter slide 162 at the seaming station H. This unlocks and releases the lifter stem 72 for vertical movement.

Figure 5:
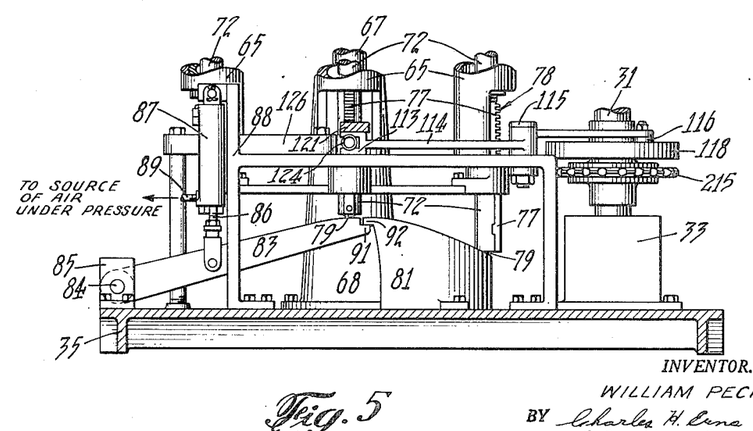
Fig. 5 is a fragmentary side elevation as taken substantially along the broken line 5—5 in Fig. 4, with parts broken away.
Figure 20:
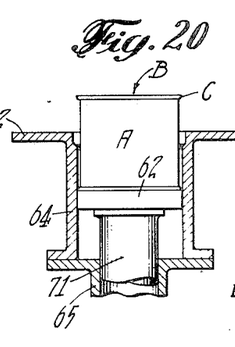

During the remaining portion of this advancement of the turn table 66 into the idle station K and its following partial rotation to return the closed can to the loading station F, the lower end of the lifter stem 72 travels above the curved stationary cam 81. During this travel the cam roller 79 on the lower end of the lifter stem engages and rides along the cam and this elevates the lifter stem 72 and the lifter pad 62 attached thereto and thus raises the closed can A out of its mold 64 as shown in Fig. 20 so that it may be manually removed at the loading station F and a new open can A placed on the lifter pad 62 for a closing operation. At the loading station F the cam roller 79 on the lifter stem rides off the cam 81 and onto the yieldable arm 83 where it comes to rest, as shown in Fig. 5. This completes the travel of the can through the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can closing machine for random height cans, the combination of a can closing head, a conveyor disposed adjacent said head and movable through a plurality of working stations, a can support freely mounted on said conveyor for movement therewith and for independent movement vertically thereto for receiving and supporting individually cans of random heights, means engageable with a can on said support at one station for depressing the can and its support to prelocate the top edge of the can at a predetermined level relative to said closing head irrespective of the height of the can, and means adjacent said closing head for lifting said can support a fixed distance for all cans to insert the top edge of a prelocated can on said support into said closing head for a can closing operation.

2. In a can closing machine for random height cans, the combination of a can closing head, a conveyor disposed adjacent said head and movable through a plurality of working stations, a can support freely mounted on said conveyor for movement therewith and for independent movement vertically thereto for receiving and supporting individually cans of random heights, a pusher head located above and in vertical alignment with said can support at one of said stations, actuating means for moving said pusher head toward said can support and for stopping the moving pusher head at a predetermined level relative to said closing head irrespective of the height of the can on said support to effect engagement of said pusher head with a said can and to depress said can and its support to prelocate the top edge of all cans at said predetermined level, and means adjacent said closing head for lifting said can support a fixed distance for all cans to insert the top edge of a prelocated can on said support into said closing head for a can closing operation.

3. In a can closing machine for random height cans, the combination of a can closing head, a conveyor disposed adjacent said head and movable through a plurality of working stations, a can support freely mounted on said conveyor for movement therewith and for independent movement vertically thereto for receiving and supporting individually cans of random heights, a pusher head located above and in vertical alignment with said can support at one of said stations, actuating means for moving said pusher head toward said can support and for stopping the moving pusher head at a predetermined level relative to said closing head irrespective of the height of the can on said support to effect engagement of said pusher head with a said can and to depress said can and its support to prelocate the top edge of all cans at said predetermined level, means for maintaining said can support and its can at said predetermined level during their travel with said conveyor to said closing head, and means adjacent said closing head for lifting said can support a fixed distance for all cans to insert the top edge of a prelocated can on said support into said closing head for a can closing operation.

4. In a can closing machine for random height cans, the combination of a can closing head, a conveyor disposed adjacent said head and movable through a plurality of working stations, a can support freely mounted on said conveyor for movement therewith and for independent movement vertically thereto for receiving and supporting individually cans of random heights, a lifter rod yieldably connected with said can support, means engageable with a can on said support at one station for depressing the can, its support, and its lifter rod to prelocate the top edge of the can at a predetermined level relative to said closing head irrespective of the height of the can, means at said station and engageable with said lifter rod for holding said rod in its prelocated position, stationary means disposed adjacent the path of travel of said lifter rod with said conveyor for retaining said rod in its prelocated position during its travel with said conveyor, and means adjacent said closing head for engaging said lifter rod in its prelocated position and for raising it and said support toward and away from said closing head for shifting the can into and out of the closing head for the closing operation.

5. In a can closing machine for random height cans, the combination of a can closing head, a conveyor disposed adjacent said head and movable through a plurality of working stations, an open top solid mold carried on said conveyor for rceiving and holding a can against rotation for presentation to said closing head, a can support reciprocably mounted in said mold for supporting individually cans of random heights, means engageable with a can on said support at one station for depressing the can and its support to prelocate the top edge of of the can at a predetermined level relative to said closing head irrespective of the height of the can, means for actuating said conveyor to advance said support to a station adjacent said closing head, means adjacent said closing head for moving said can support a fixed distance toward and away from said closing head to insert and withdraw the top edge of a prelocated can on said support into and from said closing head for a can closing operation, and means disposed adjacent the path of travel of said conveyor beyond said closing head for elevating said can support in said mold to raise the sealed can out of the mold for removal.

6. In a can closing machine for random height cans, the combination of a can closing head, a conveyor disposed adjacent said head and movable through a plurality of working stations, a can support freely mounted on said conveyor for movement therewith and for independent movement vertically thereto for receiving and supporting individually cans of random heights, a lifter rod yieldably connected with said can support, said lifter rod having a series of rack teeth therealong, means engageable with a can on said support at one station of redepressing the can, its support, and its lifter rod to prelocate the top edge of the can at a predetermined level relative to said closing head irrespective of the height of the can, a yieldable locking block having rack teeth at said station for meshing engagement with the rack teeth of said lifter rod, means for actuating said locking block toward and away from said lifter rod for locking said rod against vertical movement after a prelocating operation to hold said rod in its prelocated position, a sationary guide rail disposed adjacent the path of travel of said lifter rod with said conveyor, said rail having longitudinal rack teeth disposed in alignment with the teeth in said locking block for receiving said prelocated lifter rod from said locking block and for continuing the maintenance of said rod in its prelocated position, a vertically movable lifter block disposed adjacent said closing head, said lifter block having rack teeth aligned with the rack teeth of said guide rail for receiving the prelocated lifter rod from said rail, and means for raising and lowering said lifter block toward and away from said closing head for lifting the can into the head for a closing operation and to withdraw the closed can therefrom.

7. In a can closing machine for random height cans, the combination of a housing having an opening in its bottom and enclosing a can vacuumizing chamber, a can closing head disposed within said chamber, a conveyor movable through a plurality of working stations toward and away from said housing, an open top mold carried on said conveyor for receiving and enclosing a can to be closed, a can support reciprocably mounted in said mold for supporting individually cans of random heights, means for prelocating the top edge of the can at a predetermined level within said mold and relative to said closing head irrespective of the height of the can, means for actuating said conveyor to align said mold with the opening in the bottom of said housing, a resilient sealing member disposed between the bottom of said housing and the top of said mold, means for distorting said sealing member to seal off the space between said housing and said mold to exclude the outside atmosphere from entrance into said chamber and said mold to effect a vacuumizing of said can, and means adjacent said closing head for lifting and lowering said can support to insert and withdraw the can into and from said closing head for a closing operation.

8. In a can closing machine, the combination of a housing having an opening in its bottom and enclosing a can vacuumizing chamber, a can closing head disposed within said chamber, an open top mold for receiving and enclosing a can to be closed, a can support reciprocably mounted in said mold for supporting the can therein, means for shifting said mold into position adjacent said housing with the open top of said mold adjacent and in closely spaced relation to the opening in the bottom of said housing, a resilient sealing ring surrounding the opening in the bottom of said housing, said sealing ring having a free annular portion and a fixed annular portion sealed against the bottom of said housing, means for pressing the free annular portion of said sealing ring against the top of said mold to seal off the space between said housing and said mold to exclude the outside atmosphere from entrance into said chamber and said mold to effect a vacuumizing of said can, and means adjacent said closing head for lifting and lowering said can support to insert and withdraw the can into and from said closing head for a closing operation.

9. In a can closing machine, the combination of a housing having an opening in its bottom and enclosing a can vacuumizing chamber, a can closing head disposed within said chamber, an open top mold for receiving and enclosing a can to be closed, a can support reciprocably mounted in said mold for supporting the can therein, means for shifting said mold into position adjacent said housing with the open top of said mold adjacent and in closely spaced relation to the opening in the bottom of said housing, a resilient sealing ring surrounding the opening in the bottom of said housing, said sealing ring having a free annular portion and a fixed annular portion sealed against the bottom of said housing, a compression ring disposed above said free annular portion of said sealing ring, an actuating ring surrounding said compression ring and having inclined cam tracks in operating engagement with portions of said compression ring, means for rotatably supporting said actuating ring, means for oscillating said actuating ring around said compression ring to lower and raise said compression ring and said sealing ring for pressing the free annular portion of said sealing ring against the top of said mold to seal off the space between said housing and said mold to exclude the outside atmosphere from entrance into said chamber and said mold to effect a vacuumizing of said can, and means adjacent said closing head for lifting and lowering said can support to insert and withdraw the can into and from said closing head for a closing operation.

10. In a can closing machine, the combination of a housing having an opening in its bottom and enclosing a can vacuumizing chamber, a can closing head disposed within said chamber, an open top mold for receiving and enclosing a can to be closed, a can support reciprocably mounted in said mold for supporting the can therein, means for shifting said mold into position adjacent said housing with the open top of said mold adjacent and in closely spaced relation to the opening in the bottom of said housing, a resilient sealing ring surrounding the opening in the bottom of said housing, said sealing ring having an annular rectangular shaped body portion with a laterally extending web portion, said web portion being sealed to said housing and said body portion being free, means for pressing the free annular body portion of said sealing ring against the top of said mold to seal off the space between said housing and said mold to exclude the outside atmosphere from entrance into said chamber and said mold to effect a vacuumizing of said can, means disposed adjacent the upper and lower edges of said body portion of said sealing ring to retain said sealing ring in substantial rectangular shape during compression, and means adjacent said closing head for lifting and lowering said can support to insert and withdraw the can into and from said closing head for a closing operation.

11. In a can closing machine for random height cans, the combination of a can closing head, a rotatable turn table disposed adjacent said head and intermittently rotatable through a plurality of working stations, a can support freely mounted on said turn table for movement therewith and for independent movement vertically thereto for receiving and supporting individually cans of random heights, means engageable with a can on said support at one station for depressing the can and its support to prelocate the top edge of the can at a predetermined level relative to said closing head irrespective of the height of the can, means adjacent said closing head for lifting and lowering said can support to insert the can into said closing head for a closing operation and to withdraw the closed can therefrom, and actuating means for intermittently rotating said turn table through said working stations, said actuating means including a plurality of grooved Geneva blocks on said turn table in peripherally spaced radial locations, a rotatable Geneva arm disposed adjacent said turn table and having a free end movable through an arc and engageable in said grooved blocks individually for rotating said table, means for rotating said arm, and means for shifting said arm radially to effect a flattening of the arc described by its free end during engagement with a said grooved block to control the speed of rotation of said turn table.

12. In a can closing machine, the combination comprising a housing having an opening in its bottom and enclosing a chamber, a flange on said housing surrounding said opening therein, a can closing head disposed within said chamber, an open top mold for receiving and enclosing a can to be closed, a flange on said mold surrounding said open end thereof, a resilient sealing ring having an annular body portion with a laterally extending web portion, said web portion of the ring being sealed to one of said housing and mold flanges and said body portion of the ring being free and aligned with the other of said flanges, means for moving said free annular body portion of the sealing ring toward said other flange and for pressing it thereagainst to seal off the space between said housing and said mold to exclude outside atmosphere from said chamber and said mold, and means for relatively moving said closing head and can one toward the other to working positions for a closing operation while said chamber and said mold are thus sealed against outside atmosphere.

13. In a can closing machine for random height cans, the combination of a can closing head, a conveyor disposed adjacent said head and movable through a plurality of working stations, a can support freely mounted on said conveyor for movement therewith and for independent movement vertically thereto for receiving and supporting individually cans of random heights, means operable upon a said can and its support at one station for moving said can and its support vertically to prelocate the top edge of the can at a predetermined level relative to said closing head irrespective of the height of the can, and means adjacent said closing head for lifting said can support a fixed distance for all cans to insert the top edge of the prelocated can on said support into said closing head for a can closing operation.

References Cited in the file of this patent

UNITED STATES PATENTS

| Number | Name | Date |
|---|---|---|
| 874,035 | Prentice | Dec. 17, 1907 |
| 1,825,442 | Chambon | Sept. 29, 1931 |
| 2,119,665 | Cameron | June 7, 1938 |
| 2,544,009 | Detrez | Mar. 6, 1951 |